US007946544B2

(12) United States Patent
Benshetrit

(10) Patent No.: US 7,946,544 B2
(45) Date of Patent: May 24, 2011

(54) FOLDING SUPPORT OR FRAME STRUCTURE

(76) Inventor: Dror Benshetrit, New York, NY (US)

( * ) Notice: Subject to any disclaimer, the term of this patent is extended or adjusted under 35 U.S.C. 154(b) by 829 days.

(21) Appl. No.: 11/845,904

(22) Filed: Aug. 28, 2007

(65) Prior Publication Data

US 2008/0048089 A1 Feb. 28, 2008

Related U.S. Application Data

(60) Provisional application No. 60/840,621, filed on Aug. 28, 2006.

(51) Int. Cl.
*F16M 11/38* (2006.01)

(52) U.S. Cl. .................. 248/188.6; 248/150; 248/440.1; 248/694; 52/272; 52/646

(58) Field of Classification Search .................. 248/558, 248/150, 188, 188.6, 166, 440.1, 694; 108/157, 108/159; 52/655.1, 645, 646, 272, 574, 561, 52/656.5
See application file for complete search history.

(56) References Cited

U.S. PATENT DOCUMENTS

| | | | | |
|---|---|---|---|---|
| 2,247,614 | A | 7/1941 | Lingenfelter | |
| 2,551,775 | A * | 5/1951 | Von Canon | 217/65 |
| 3,025,640 | A | 3/1962 | Muhr | |
| 3,164,281 | A * | 1/1965 | Williams, Jr. | 217/14 |
| 4,305,519 | A * | 12/1981 | Gerich | 220/7 |
| 4,766,711 | A | 8/1988 | Bermingham et al. | |
| 4,874,341 | A * | 10/1989 | Ziegler | 446/109 |
| 5,069,144 | A * | 12/1991 | Williford | 108/129 |
| 7,118,442 | B2 * | 10/2006 | Laliberte et al. | 446/85 |
| 7,129,413 | B1 * | 10/2006 | Rao et al. | 174/66 |
| 2008/0048089 | A1 | 2/2008 | Benshetrit | |

* cited by examiner

*Primary Examiner* — Anita M King
(74) *Attorney, Agent, or Firm* — Gottlieb, Rackman & Reisman, P.C.

(57) ABSTRACT

A structure is described that has an open and closed configuration. In the open configuration, the structure is free standing and is able to support weight. In the closed configuration, the structure is flat. The structure is formed of two elements that are interlocked at their corners in a manner that allows them to pivot with respect to each other. Chamfered surfaces on the sides of the elements provide stops limiting the motion between the elements. Several structures may be combined to form composite products.

13 Claims, 10 Drawing Sheets

FIG. 1A
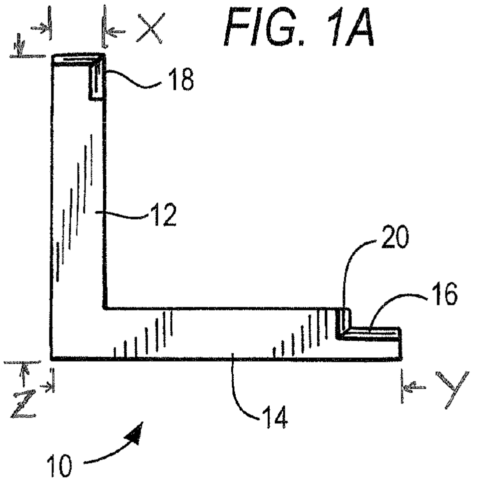
FIG. 1B
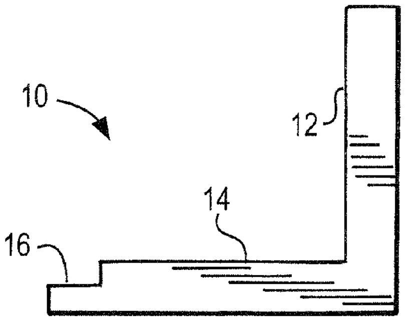
FIG. 2A
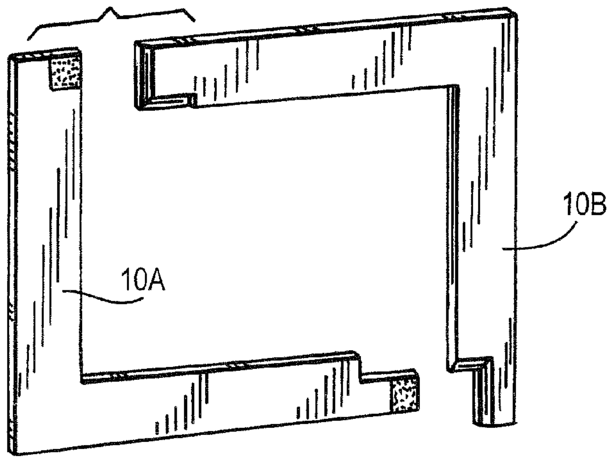
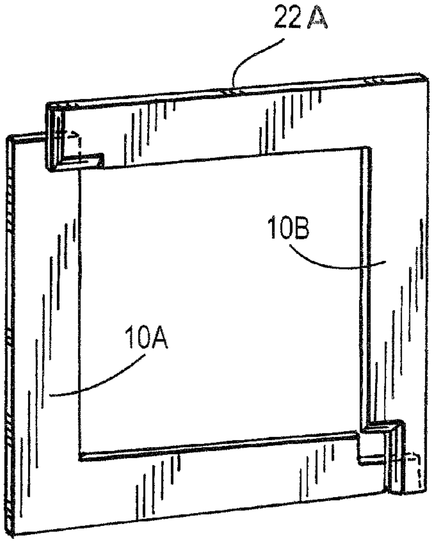
FIG. 2B

FIG. 2C
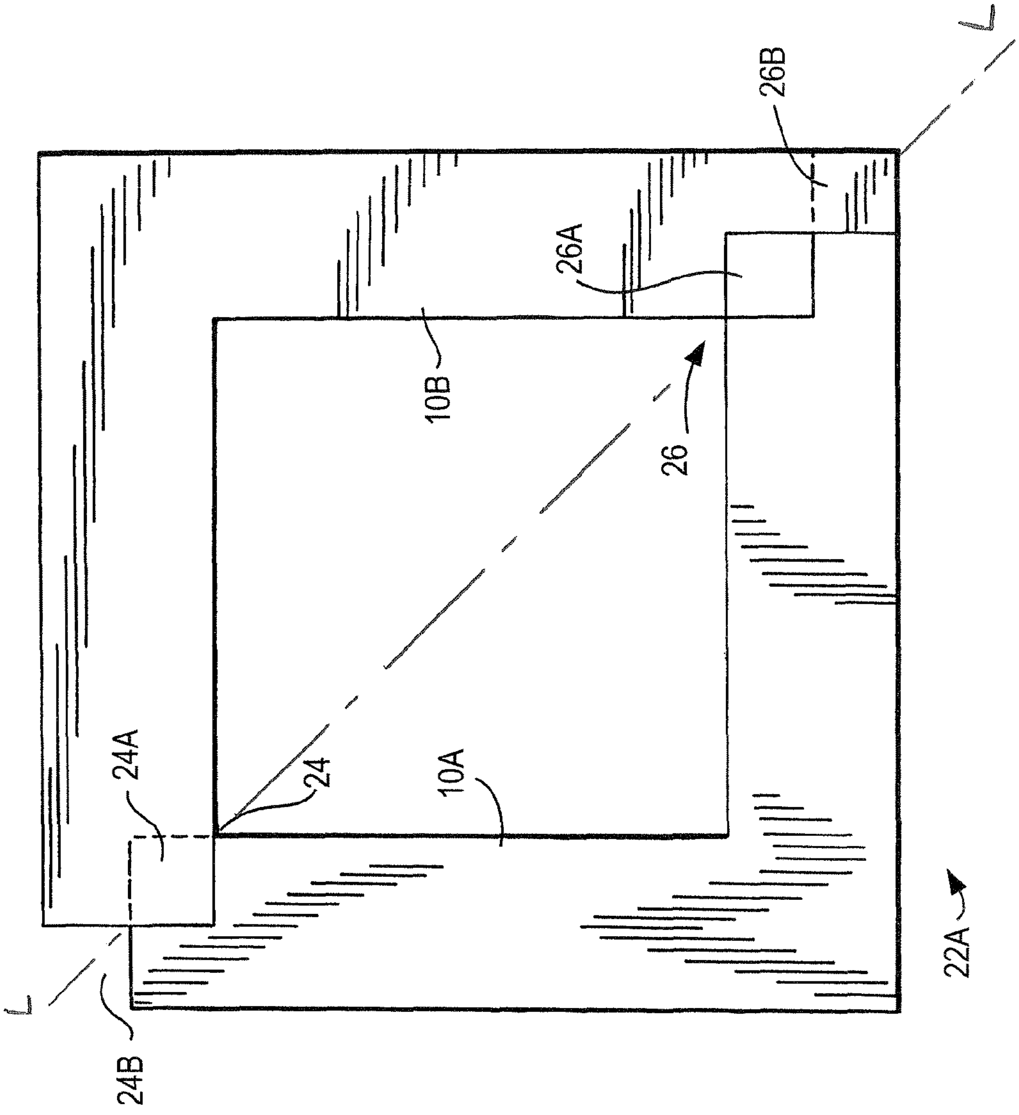
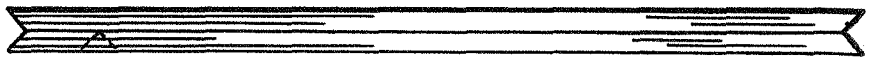
FIG. 3C

FIG. 7A
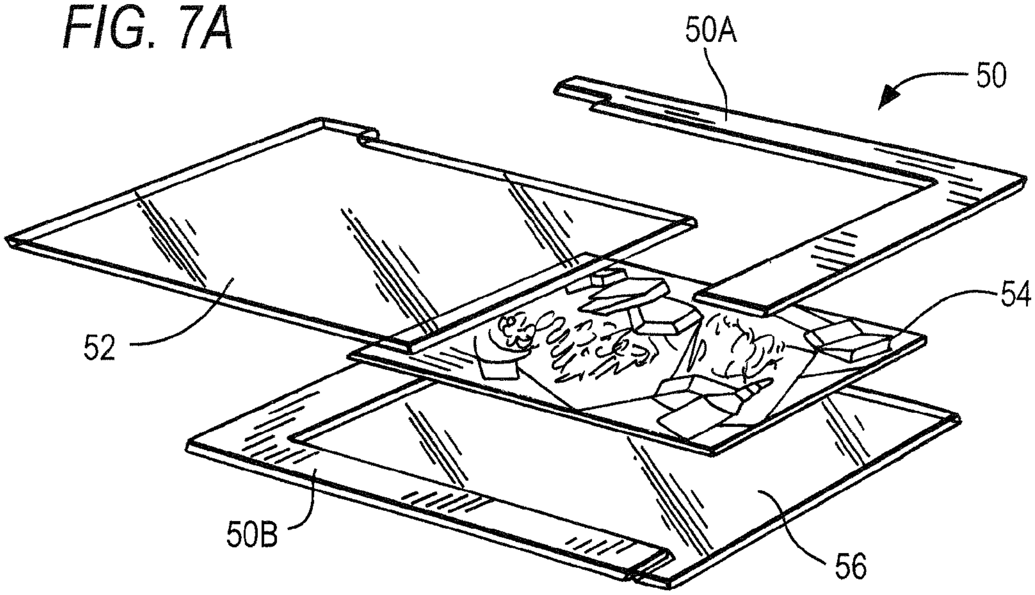
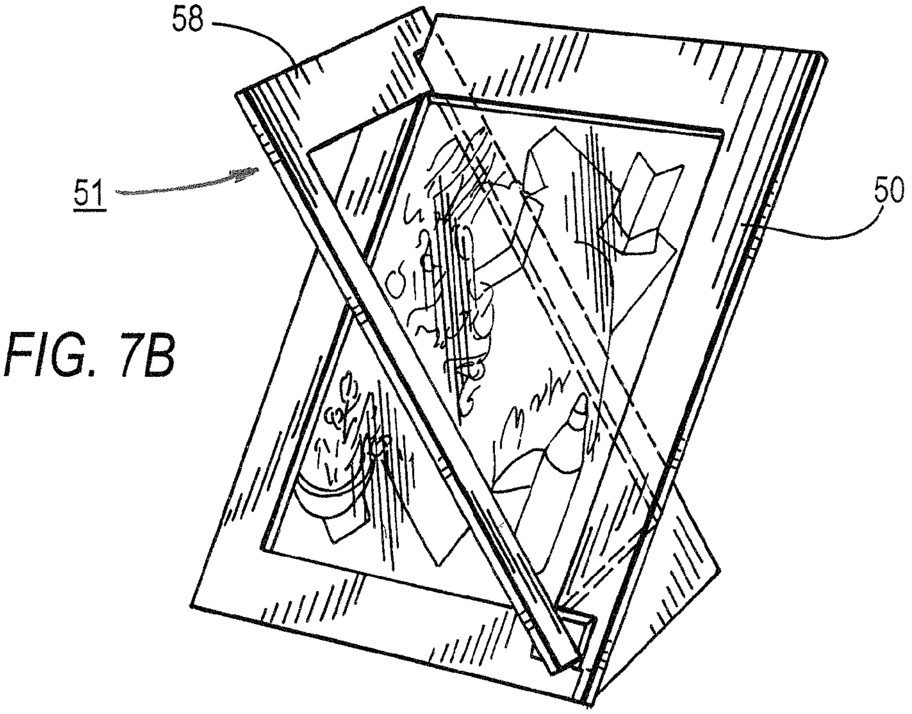
FIG. 7B

FOLDING SUPPORT OR FRAME STRUCTURE

RELATED APPLICATIONS

This application claims priority to provisional application Ser. No. 60/840,621 filed Aug. 28, 2006 and incorporated herein by reference.

BACKGROUND OF THE INVENTION

A. Field of Invention

This invention pertains to a support or frame structure made of at least identical elements, each element having the shape of a parallelogram, the two elements being joined together in a manner that permits some pivoting of the elements about a diagonal axis.

B. Description of the Prior Art

A basic structural element used for many different purposes is a truss. A typical truss is formed of three linear rigid members, such as bars joined at their ends to form a triangle. Several trusses can be interconnected to form more complex three-dimensional support members. Trusses have been found to be very desirable structural elements because they can withstand large static and dynamic stresses and compressions without damage and are used in many different situations and common every-day objects, starting from relatively small objects such as small picture frames and stands, saw horses, and going all the way to large bridges and building sections.

In some situations support structures are required that can be folded for storage or shipping. For these situations, structures are used that include one or more joints that are either disassembled, or provided with hinges. However, these structures are generally expensive, less reliable, and, often, esthetically unacceptable.

SUMMARY OF THE INVENTION

A basic support structure or frame constructed in accordance with this invention includes two elements, generally having the shape of a parallelogram with two opposed corners defining a diagonal axis. The two elements are interlocked at the two opposed corners in a manner that allows them to pivot with respect to each other around said diagonal axis. Preferably the elements have sides that are chamfered at least at said corners to provide a stop limiting the respective pivoting of the two elements. In this manner the structure is formed without any hinges or other similar means between the two elements.

In one embodiment, each element is formed of two joined L-shaped components. In one embodiment, the components of the two elements are identical.

The structure is used to make or support various products. For some of these applications, the structures are formed of square or rectangular elements. In other applications the elements have obtuse and acute rather then right angles.

BRIEF DESCRIPTION OF THE DRAWINGS

FIGS. 1A and 1B show a front and a back view of a component for a first embodiment of the invention;

FIGS. 2A, 2B and 2C show two components like the ones shown in FIGS. 1A, 1B being joined to make a first element;

FIG. 3C shows a side view of the support;

FIGS. 7A and 7B show a blown up view and an isometric view, respectively, of a picture frame constructed in accordance with this invention.

DETAILED DESCRIPTION OF THE INVENTION

Figure 3A:
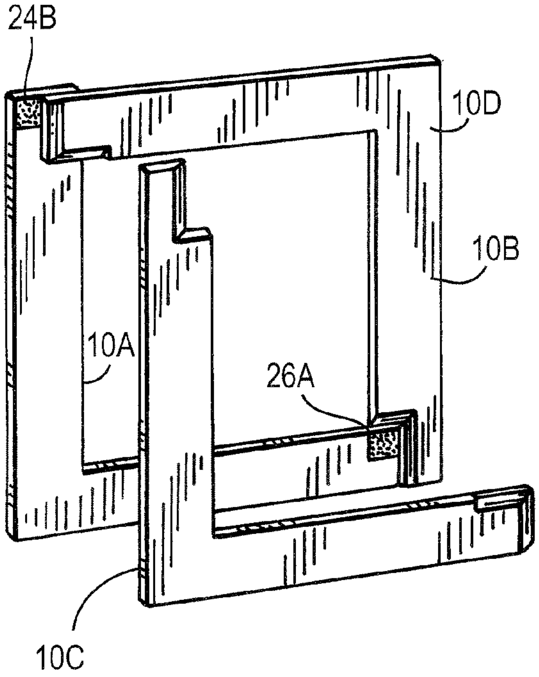
FIGS. 3A and 3B show two elements similar to the ones shown in FIGS. 2A and 2B joined to make a basic folding support.
Figure 3B:
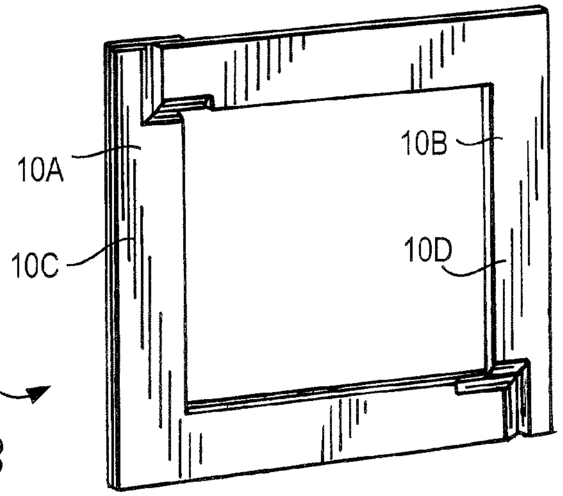

In one embodiment of the invention, a structure constructed in accordance with a first embodiment of the invention is formed of four identical components. FIGS. 1A and 1B show the front and back of such a basic component 10. The component 10 is generally L-shaped with a first leg 12 and a second leg 14. In the following embodiments the two legs are shown perpendicular to each other, however, they may be at an acute or obtuse angle as well, as described below. Preferably, the two legs have the same width X.

Leg 12 has a length Z and is chamfered at its free end as shown at 18. Leg 14 has a length Y and is formed with a cut-out 16 at one end with chamfered or beveled surfaces as at 20. The chamfer angle can range from 10 to 80 degrees, this angle being different for different sizes and applications, as discussed below.

Referring to FIGS. 2A-2C, two components 10A, 10B are then joined to form a first element 22A as follows: starting with FIG. 2A, first component 10A is positioned as shown, and the second component 10B is rotated to the position shown with respect to component 10A. The two components 10A, 10B are then partially superimposed at the two opposite ends and joined to form a first element 22A. The components 10A, 10B can be joined by any well known means. For example, an adhesive may be applied between them. Alternatively, the two components may be screwed, nailed or welded together.

The resulting element 22A is shown in a plan view in FIG. 2C. In this figure the chamfered surfaces have been omitted for the sake of clarity. As can be seen in this figure, the element 22A has a rectangular shape having a width of Z+X/2 and a height of Y. If the legs are identical the element 22A is a square. The two components 10A, 10B overlap at two diagonally opposite corners 24, 26. More specifically, at corner 24, the components form an overlapping inner square region 24A and an outer square opening 24B. At corner 26, the components 10A, 10B form an inner square opening 26A, and an outer square region 26B. The components are joined in regions 24A, 26B and common regions 24A, 26B. Openings 26A, 24B all have a square shape with an X/2 side. These features are disposed symmetrically about a diagonal axis L-L.

Referring now to FIGS. 3A, 3B, 3C, 3D, a second element 22B is provided that is identical with the element 22A and is formed of components 10C, 10D. The second element 22B is assembled from its components 10C, 10D so that it is interlocked with element 22A. More specifically, first the component 10D is disposed under component 10B as shown in FIG.

3A. The component 10D is positioned with its common regions used for joining it to the component 10C are visible through the openings 26A, 24B. Then component 10C is placed over component 10A and joined to component 10D through openings 26A, 24B using an adhesive, for example. Thus, it should be apparent that second element 22B is rotated by 180 degrees with respect to element 22A. It should be further apparent that the two elements 22A, 22B are interlocked because the common regions of one are disposed in the windows of the other, and vice versa. It should be appreciated that the overall thickness of structure 30 is equal to double the thickness of any of the components 10A, 10B, 10C, 10D, as shown in FIG. 3C.

Figure 3D:
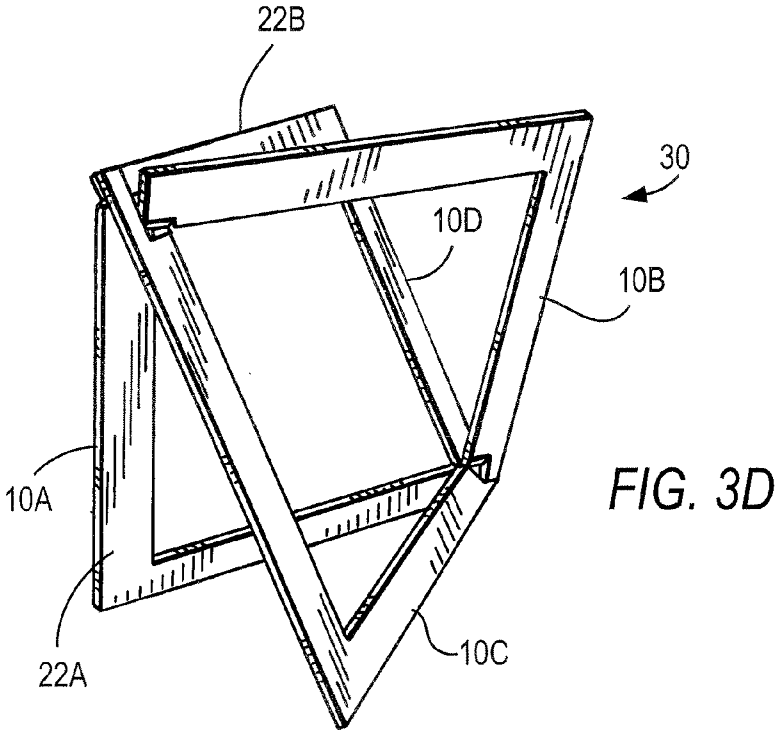
FIG. 3D shows an isometric view of the support formed in FIGS. 3A and 3B, with the two elements being rotated about axis L-L.

Since the two elements 22A, 22B are not mechanically fixed to each other, they can pivot with respect to each other along diagonal axis L-L as shown in FIG. 3D. Importantly, the movement of the elements is limited by the chamfered surfaces 18, 20. In other words, the two elements 22A, 22B can be pivoted from the superimposed or closed configuration shown in FIG. 3B toward the open configuration shown in FIG. 3D until the chamfered surfaces of the components come into contact with each other. The two elements 22A, 22B cannot be pivoted any further because the chamfered surfaces act as stops and will resist any additional forces to pivot them further. In this manner, structure 30 in the open configuration is a free standing structure that can rest on a surface on its own and can be used to support additional weight, as discussed in detail below.

While elements 22A, 22B are each made of two components, it should be understood that they may be made of a single component as well, using standard techniques dependent on the material of the component. For example, the elements are best made from two components if they are made of paper or cardboard. If the elements are made of metal, wood, plastic, etc., they can be made from a single component, by casting molding, etc. If they are made of a single component, however, during assembly at least, one of the elements will have to be cut or other means must be provided so as to allow the two elements to be assembled in the interlocking position required to make the structure 30.

In the embodiment described so far, the components are provided with chamfered surfaces only at the corners where the elements are interlocked. In an alternate embodiment, some or all the edges of the components are chamfered or beveled for esthetic reasons, as shown in FIG. 3C in order to provide better support surfaces for objects disposed on the structure 30 and so on or for esthetic reasons.

Figure 4B:
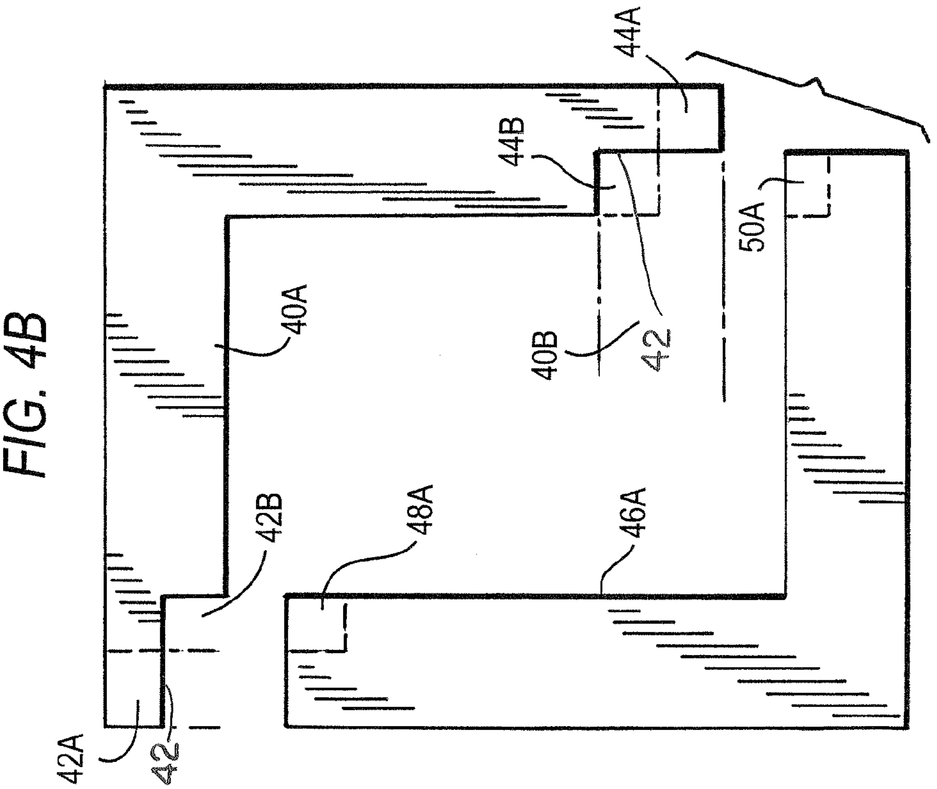
FIGS. 4A and 4B show the components of an alternate embodiment of the invention.
Figure 4A:
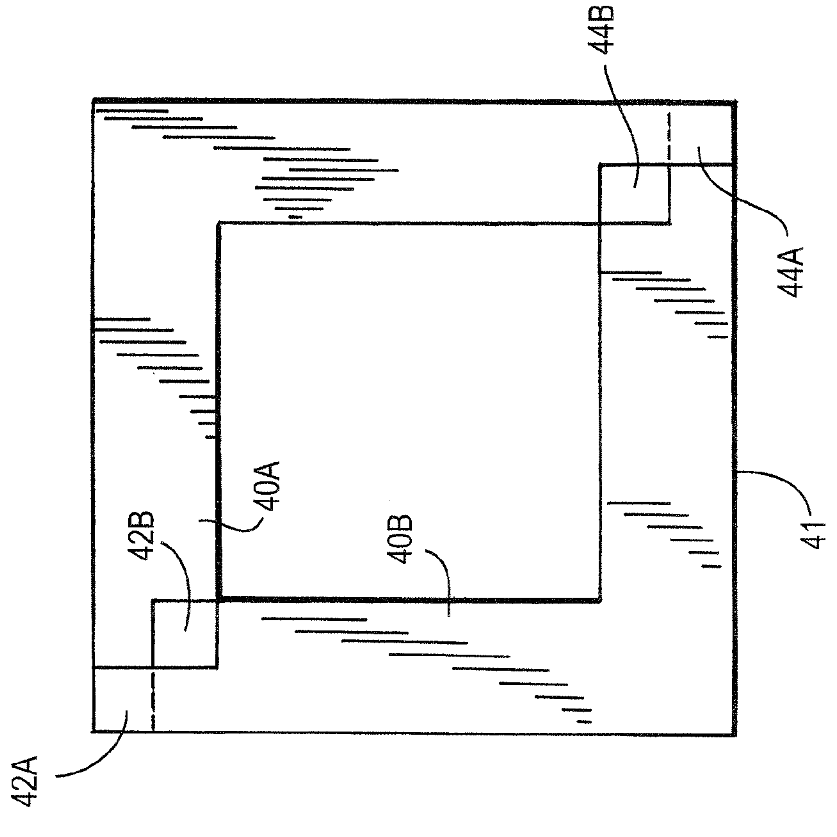

In the embodiment of FIGS. 1, 2, and 3, the elements 22A, 22B are made of all identical components. In an alternate embodiment shown in FIGS. 4A and 4B, a first element 41 is made of two components, such as component 40A. Component 40A has cutouts 42 with chamfered surfaces (not shown) at both ends. The two components 40A, 40B are joined at two outer regions 42A, 44A and form two inner openings 42B, 44B (FIG. 4A). The other element is assembled from two identical components, with only component 46A being shown in FIG. 4B (component 40B being shown only in phantom lines for the sake of clarity). The ends of component 46A do not have cutouts. The components of the second element are joined together at common regions 48A, 50A through openings 42B, 44B. Component 46A has a height and length that is X/2 shorter than components 42A, 42B. The resulting structure formed from interlocking these elements functions in the same manner as the one shown in FIGS. 1-3.

As noted, the structures of FIGS. 1-4 can be used either as free standing structures or as structures supporting various other objects. More specifically, by properly sizing, shaping, and selecting the appropriate materials, (and by adding additional parts, as required) the structures can be used to make picture frames, saw horses, table legs, architectural rulers, floor lamps, table lamps, mirrors, wine racks, bookshelves, divider walls, window systems, prefabricated enclosures, and many other similar products. Some of the products are shown in the Figures. In some of these products, the structure may be made of components that do not have a uniform thickness. In some of the structures, one or both elements are not square or rectangular, but instead have a general rhomboid shape (or the shape of a parallelogram) in which the elements have obtuse and acute rather then right angles.

Figure 5:
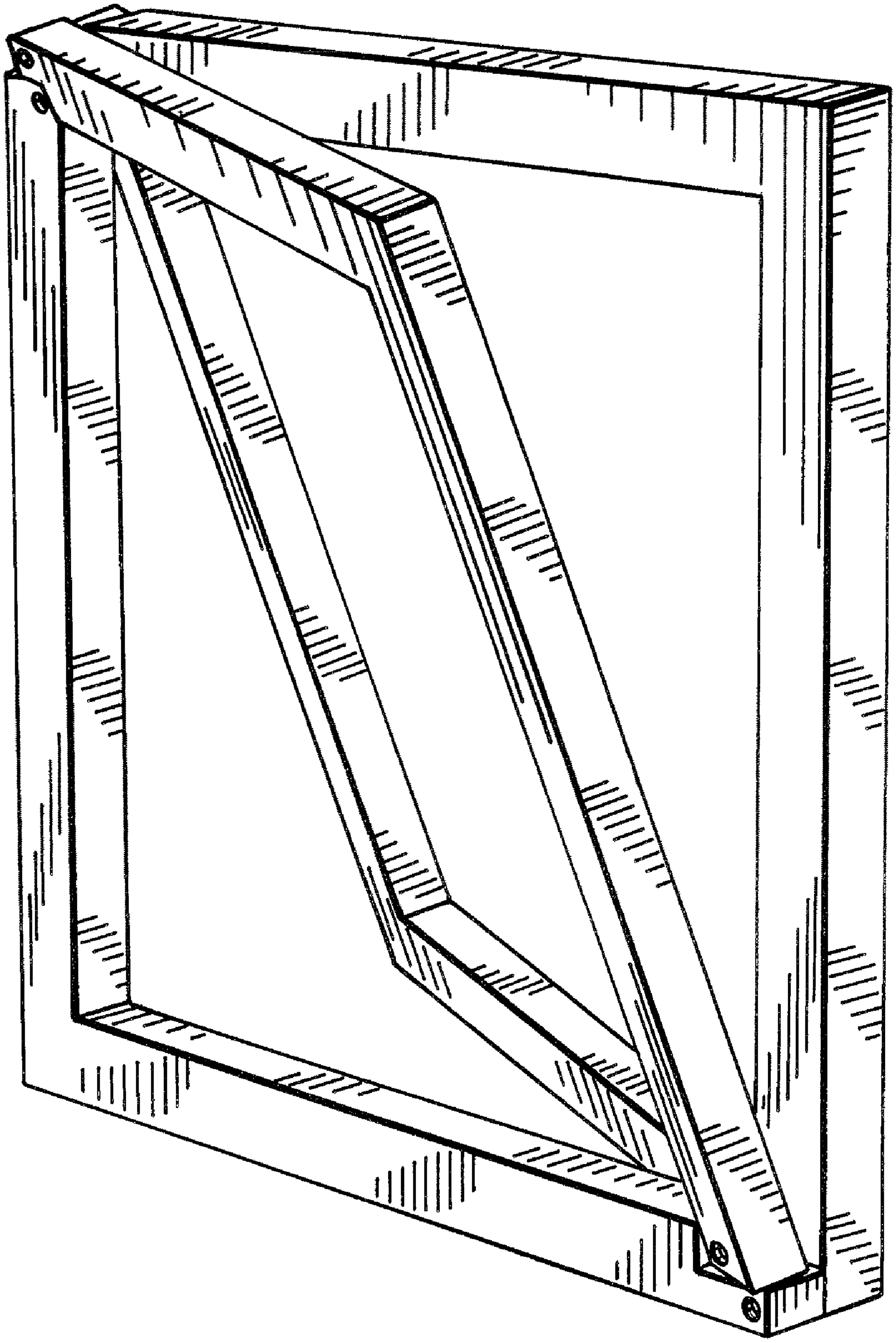
FIG. 5 shows an isometric view of a square saw horse constructed in accordance with this invention.

FIG. 5 shows a square saw horse made of stained and finished hardwood, lacquered or stained and finished MDF (medium density fiberboard), etc. The edges are chamfered at an angle of about 80 degrees and the components are joined by screws passing through holes drilled at about 76 degrees.

Figure 6A:
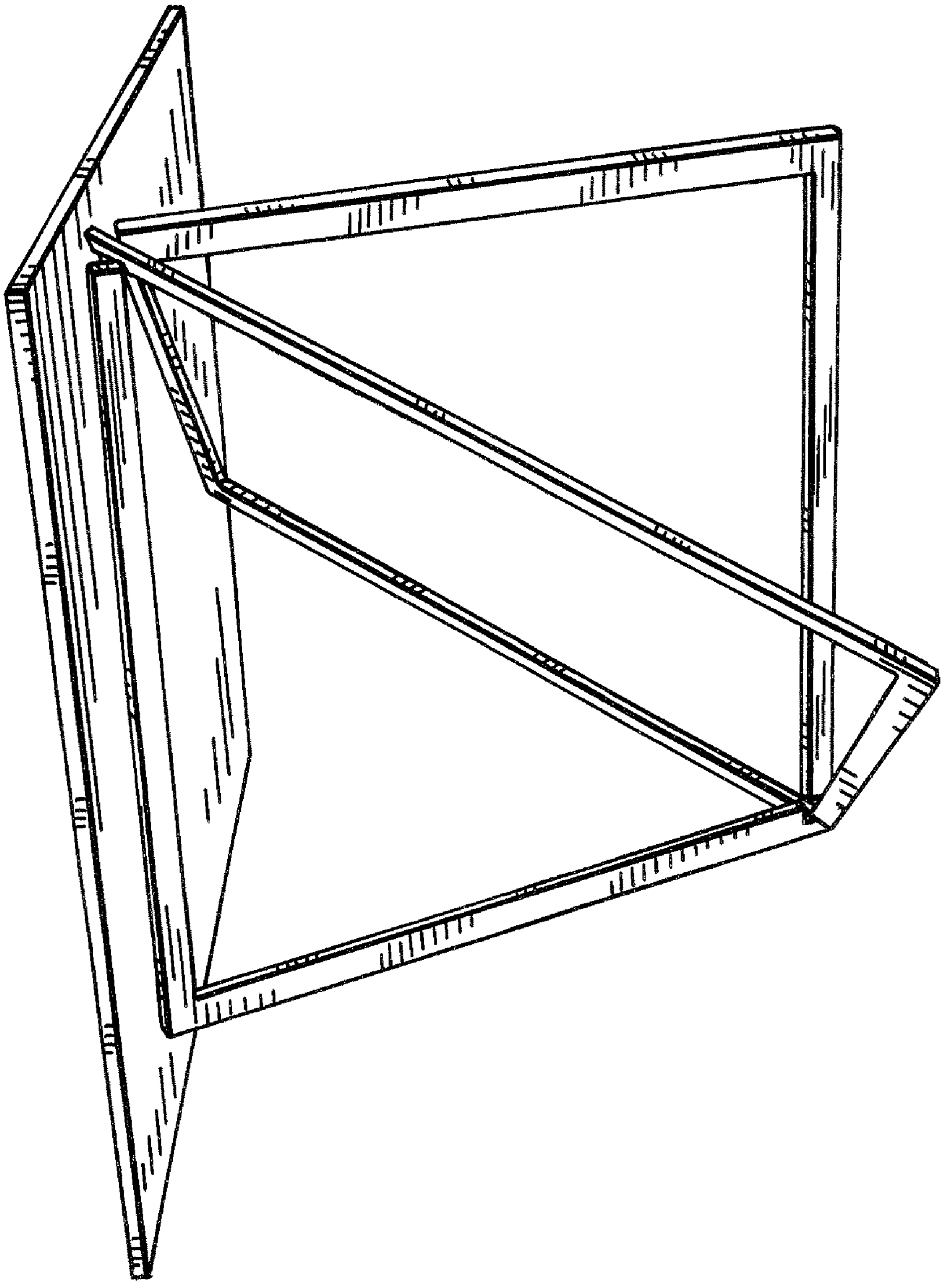
FIGS. 6A and 6B show isometric views of a table with one and two support structures, respectively.
Figure 6B:
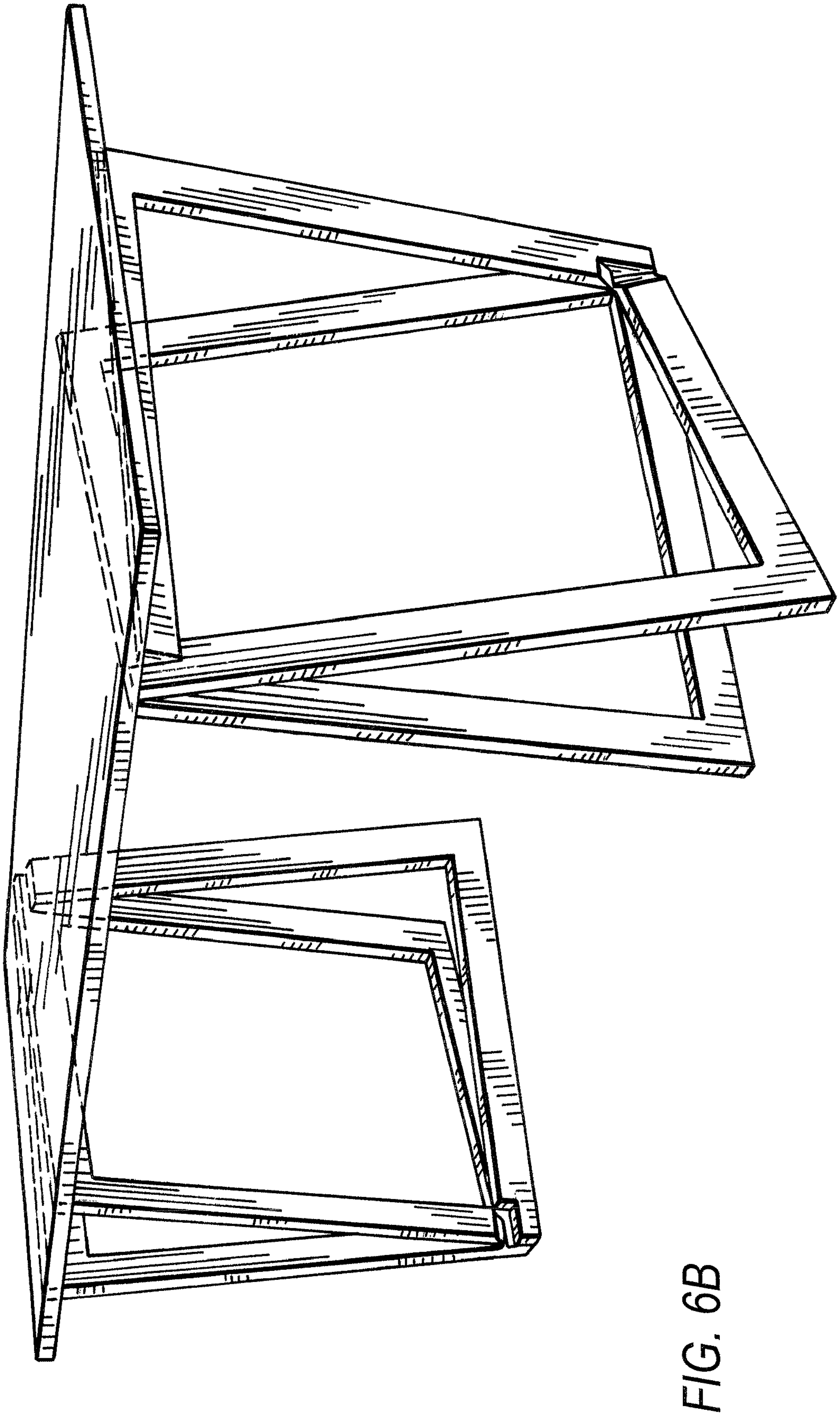

FIGS. 6A and 6B show a table with one and two supports, respectively, the supports being structures constructed in accordance with the invention. In FIG. 6A, two square elements are used with 50 degree chamfer surfaces.

FIG. 7A shows one element 50 of a picture frame 51 in which L-shaped components 50A, 50B (made of plastic, metal, etc) form a frame for a transparent cover 52, a picture 54 and a back 56. The second element 58 is provided to interlock with element 50 and form the frame as shown in FIG. 7B.

Figure 8A:
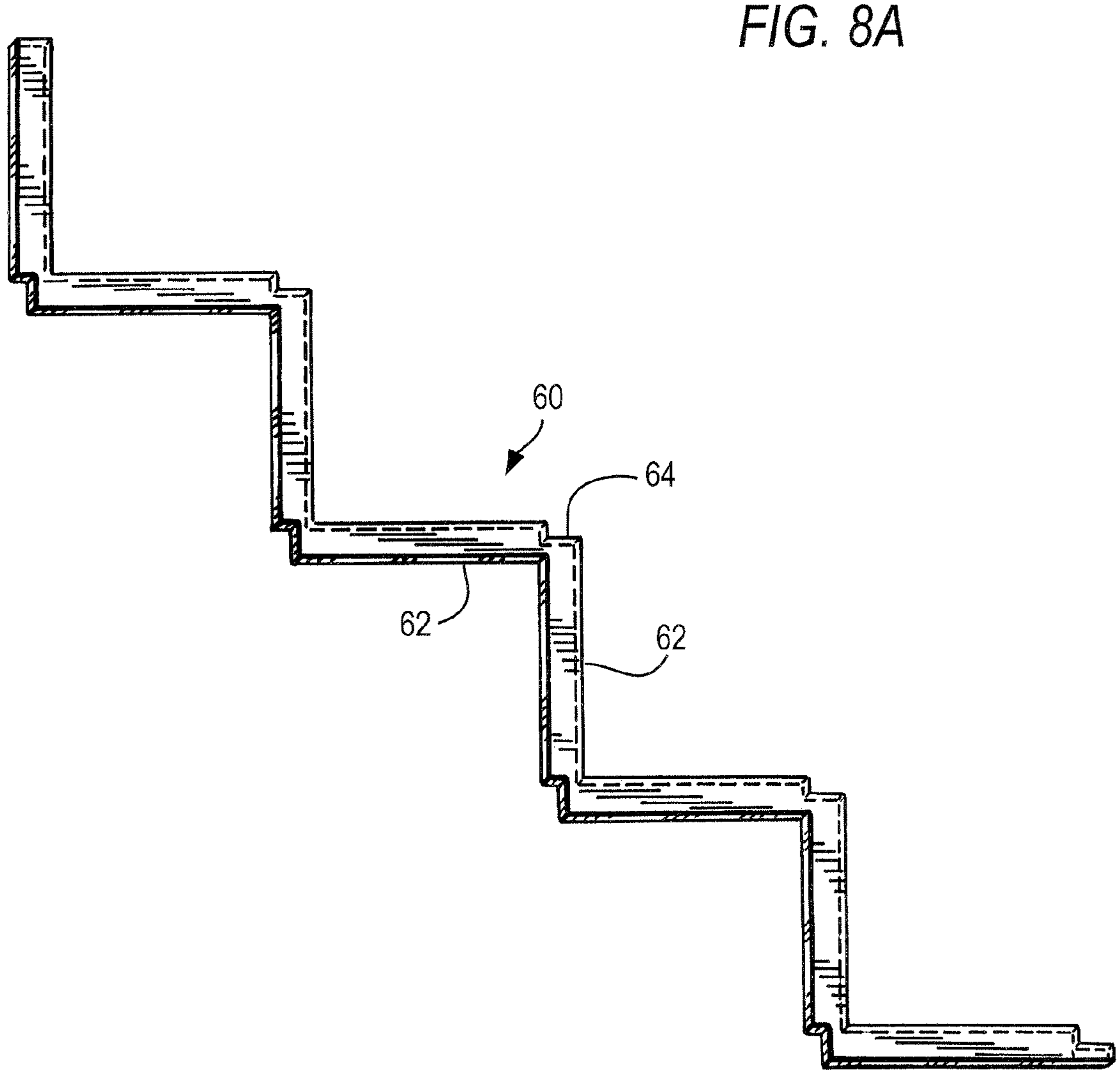
FIG. 8A shows a plan view of an element for a more complex structure.
Figure 8B:
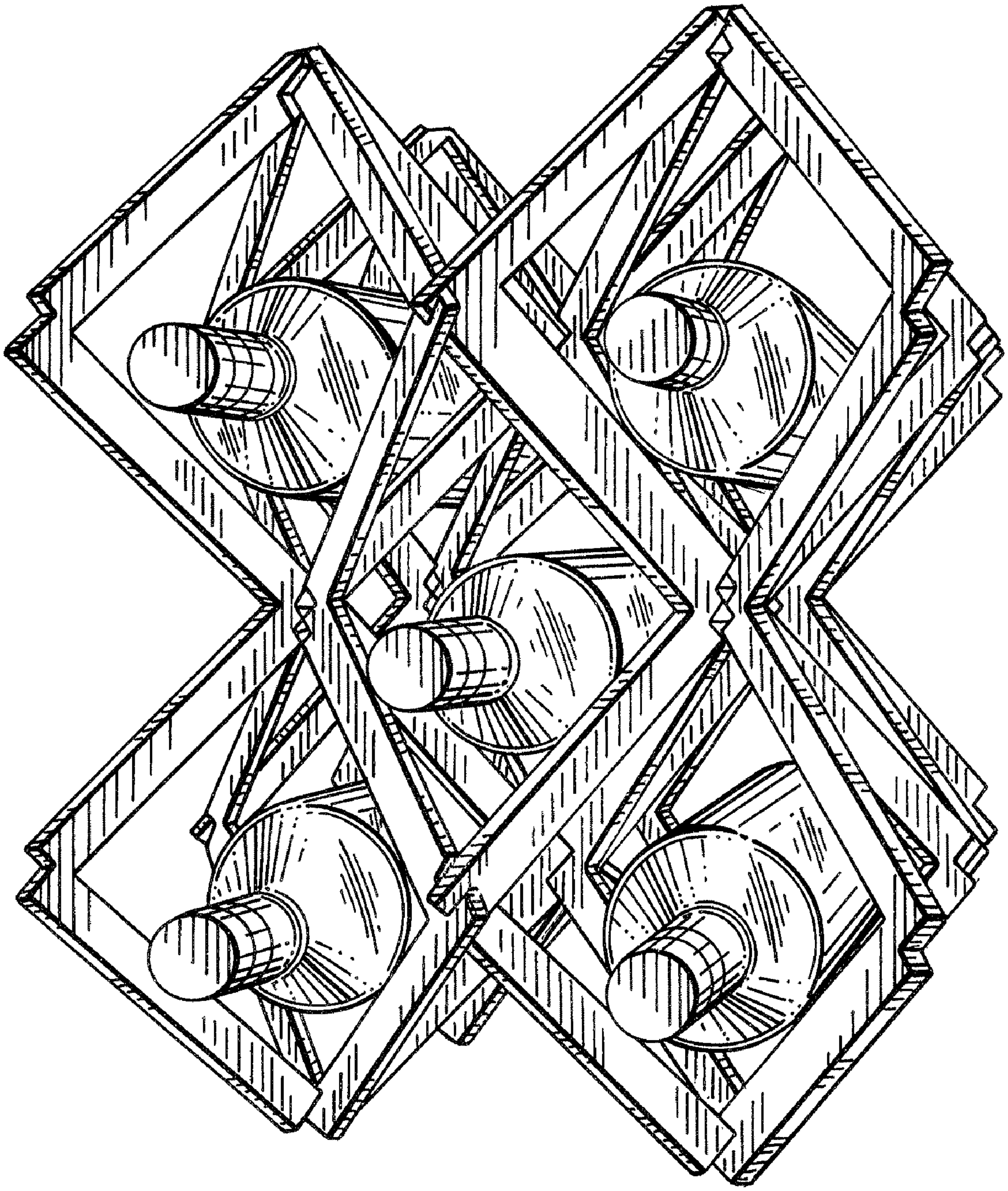
FIG. 8B shows an isometric view of a bottle holder using the element from FIG. 8A.

Of course the concepts described above can be extended to form supports having several elements. For example, an element having a zig-zag shape is shown in FIG. 8A. The element 60 is formed of several legs 62 disposed normal to each other. At each corner, cutouts 64 are provided for making regions and openings as described above. Moreover, in some instances, several cutouts may be provided at each corner to provide a more robust interlock at each corner between the elements. FIG. 8B shows a bottle holder made of several elements 60 that interlock as described above.

Numerous modifications may be made to the invention without departing from its scope as defined in the appended claims. For example, a structure can be made of L-shaped elements where the legs of the L pieces have different widths. In this embodiment the structure does not include four identical elements but in two sets of identical elements. In this embodiment, the shape of the common region and the opening at the corners are rectangular rather that square. Moreover, as mentioned above, the L shaped pieces need not meet at a right angle, resulting in a structure in which the common regions and the openings at the corners are parallelograms having obtuse and acute angles rather then being square or rectangular. These changes in dimension and shape of the L pieces of the structure may change the shape of the common region and the opening at the corners without departing from the scope of the invention defined in the appended claims.

I claim:

1. A structure comprising:

a first element and a second element, each said element having the shape of a parallelogram with two opposed corners, said elements being interlocked at said corners and pivoting around a diagonal axis passing through said corners;

wherein said elements have sides with chamfer surfaces at said corners, said chamfer surfaces providing stops limiting the pivoting of the elements.

2. The structure of claim 1 wherein said elements are square or rectangular.

3. The structure of claim 1 wherein each element is formed of two L-shaped components joined at their ends.

4. The structure of claim 3 wherein said components are identical.

5. The structure of claim 3 wherein the components of all the elements are identical.

6. The structure of claim 3 wherein said components have a cut-out at one end.

7. A structure comprising:

a first and a second element, each element having two opposed pivot corners and four sides arranged and sized to form a parallelepiped, each element being formed at the opposed pivot corners with a common region and an opening, the common region of one element being disposed in the opening of the other;

wherein said first and second elements are interlocked by said common regions and said openings to allow the elements to pivot with respect to each other about a diagonal axis passing through said pivot corners.

8. The structure of claim 7 wherein said common regions and said openings have a square shape.

9. The structure of claim 8 wherein said elements have a width X and said openings and regions have a width X/2.

10. The structure of claim 7 wherein said elements are made of two L-shaped components.

11. The structure of claim 10 wherein said components have cutouts defining said openings.

12. A compound product comprising:

a plurality of interlocked structures foldable between a closed configuration forming a flat profile and an open configuration;

each structure including a first element and a second element, each element having two opposed pivot corners and four sides arranged and sized to form a parallelepiped, each element being formed at the opposed pivot corners with a common region and an opening, the common region of one element being disposed in the opening of the other;

wherein said first and second elements are interlocked by said common regions and said openings to allow the elements to pivot with respect to each other about a diagonal axis passing through said pivot corners.

13. A structure comprising:

a first element and a second element, each said element having the shape of a parallelogram with two opposed corners, said elements being interlocked at said corners and pivoting around a diagonal axis passing through said corners, wherein each element is formed of two L-shaped components joined at their ends.

* * * * *